United States Patent Office 3,652,737
Patented Mar. 28, 1972

3,652,737
OXIME CARBAMATE PHOSPHATE, PHOSPHONATE, PHOSPHINATE AND PHOSPHOROAMIDATES
Arnold D. Gutman, Berkeley, Calif., assignor to Stauffer Chemical Company, New York, N.Y.
No Drawing. Application May 20, 1968, Ser. No. 730,588, which is a continuation-in-part of application Ser. No. 646,467, June 16, 1967. Divided and this application June 25, 1970, Ser. No. 49,933
Int. Cl. A01n 9/36; C07f 9/12, 9/18
U.S. Cl. 260—944                                         3 Claims

ABSTRACT OF THE DISCLOSURE

Oxime carbamate phosphates, phophonates, phosphinates and phosphoroamidates having the general formula:

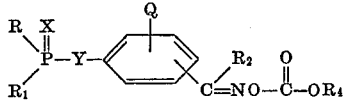

in which X and Y are independently selected from the group consisting of oxygen and sulfur; R is selected from the group lower alkyl or lower alkoxy, having from 1 to 6 carbon atoms inclusive; $R_1$ is selected from the group consisting of lower alkyl or lower alkoxy having from 1 to 6 carbon atoms, inclusive, amino, lower alkyl-substituted amino and phenyl; Q is selected from the group consisting of divalent tetramethylenediene-1,3, lower alkoxy or lower alkyl having from 1 to 4 carbon atoms inclusive, each, nitro, halogen and combinations thereof, and lower dialkyl-substituted thionophosphoryloxy; $R_2$ is selected from the group consisting of hydrogen, lower alkyl having from 1 to 4 carbon atoms, and phenyl; $R_4$ is lower alkyl having from 1 to 4 carbon atoms, inclusive, and β-chloro-loweralkyl having from 2 to 4 carbon atoms.

---

The compounds are useful as insecticides, animal contact and systemic parasiticides, herbicides and foliar fungi protectants.

This application is a division of copending application Ser. No. 730,588, filed May 20, 1968, now abandoned, which application is a continuation-in-part of then copending application Ser. No. 646,467, filed June 16, 1967, now abandoned.

This invention relates to certain novel phosphorus containing compounds which can be used as insecticides, animal parasiticides, both contact and systemic, herbicides and foliage fungi protectants. More specifically, this invention relates to certain substituted organo-oxime phosphates, phosphonates, phosphinates and phosphoroamidates and to the preparation and utility of the compounds as insecticides, animal systemic parasiticides, herbicides and foliage fungicides.

The compounds comprising the instant class of compounds correspond to the general formula:

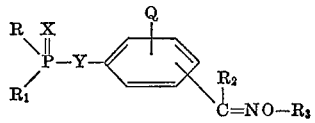

in which X and Y are independently selected from the group consisting of oxygen and sulfur; R is selected from the group lower alkyl or lower alkoxy, having from 1 to 6 carbon atoms, inclusive; $R_1$ is selected from the group consisting of lower alkyl or lower alkoxy having from 1 to 6 carbon atoms, inclusive, amino, lower alkyl-substituted amino, and phenyl; Q is selected from the group consisting of divalent tetramethylene diene-1,3, lower alkoxy or lower alkyl having from 1 to 4 carbon atoms inclusive, each, nitro, halogen and combinations thereof, and lower dialkyl substituted thionophosphoryloxy; $R_2$ is selected from the group consisting of hydrogen, lower alkyl having from 1 to 4 carbon atoms and phenyl; and $R_3$ is selected from the group consisting of hydrogen substituted carbonate and thiocarbonates of the type

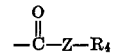

in which Z is oxygen or sulfur, $R_4$ is lower alkyl having from 1 to 4 carbon atoms, inclusive, and β-chlorolower-alkyl having from 2 to 4 carbon atoms; carbamates of the type

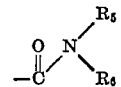

in which $R_5$ and $R_6$ are independently selected from the group consisting of hydrogen, alkyl having from 1 to 10 carbons, inclusive, substituted alkyl having 1 to 6 carbon atoms inclusive, said substituent is selected from the group consisting of hydroxy, halogen, amino, di-lower alkyl amino, lower alkoxy and tetrahydrofuryl; lower alkenyl having from 2 to 4 carbons, inclusive, carboalkoxy alkyl having a total of from 3 to 8 carbon atoms, inclusive, cycloalkyl having from 3 to 6 carbon atoms, inclusive, piperazino, 2-thiazolyl, phenyl, naphthyl, substituted phenyl wherein said substituents are selected from the group consisting of halogen, lower alkyl, lower alkoxy, lower thioalkyl, lower dialkylamino in which said lower alkyl and lower alkoxy moieties have from 1 to 4 carbon atoms, inclusive, nitro, cyano, trifluoromethyl and combinations thereof; and in which

is an N-containing heterocyclic member selected from the group consisting of morpholino, piperazino, pyrrolidino, piperadino, hexamethylenamino, pyrryl, indolyl, imidazolyl, benzimidazolyl, pyrazolyl, 1,3-oxazolidino, and 1,3-thiazolidino; esters of the type

wherein $R_7$ is selected from the group consisting of alkyl having from 1 to 8 carbons, inclusive, trichloromethyl, and lower alkenyl having from 2 to 4 carbon atoms, inclusive, and the radical —$(CH_2)_m$—SR in which $m$ is 1 or 2, R is alkyl having 1 to 6 carbon atoms, alkenyl having 2 to 4 carbon atoms, phenyl, substituted phenyl in which said substituents are selected from the group halogen, lower alkyl having 1 to 4 carbon atoms, inclusive and lower alkoxy having 1 to 4 carbon atoms, inclusive; lower alkyl substituted thiophosphoryl wherein the lower alkyl groups independently contain from 1 to 4 carbon atoms, inclusive; and 2,2,2-trichloro-1-hydroxyethyl, 4 - cyanophenyl, 2,4,5 - trichlorophenyl and 4-methylthiophenyl. Lower alkyl and lower alkoxy includes those members of the group which contain the indicated number of carbon atoms in both straight chain and branched chain configurations. Lower alkenyl includes those members of the group containing a double bond and containing from 2 to 4 carbon atoms, inclusive. When Q is divalent tetramethylene-1',3' it is bonded to the 2,3 or 3,4 carbon atoms of the phenyl ring, thereby becoming either α or β naphthyl, respectively. Also included herein is a method of preparing, using, and applying the compositions.

3

The compounds herein described can be prepared by several methods. One such general method applicable in preparing the compounds is the condensation between the appropriate substituted phosphorus-containing oxy or thio benzaldehyde, e.g. phosphoro, phosphono, and phosphino, and hydroxylamine hydrochloride in order to prepare the corresponding benzaldoxime. The benzaldoxime can be further reacted with appropriate substituted isocyanate, substituted acid chlorides, substituted chloroformate, substituted chlorothiolformate, substituted sulfonyl chloride, monosubstituted carbamyl chloride, N,N-disubstituted carbamyl chloride, substituted phosphoryl chloride, substituted thionophosphoryl chloride, or anhydrous trichloro-acetaldehyde. When $R_2$ is to be lower alkyl, an appropriate substituted-phosphoryl or substituted-thiophosphoryl lower alkyl phenylketone is condensed with hydroxylamine hydrochloride to prepare the corresponding ketoxime. Another method useful for the preparation of carbamyl derivatives is first the condensation of phosgene with the aldoxime followed by the condensation with a primary or secondary amine. The reactions proceed readily in the liquid phase. The employment of a solvent is also useful, facilitating processing, as well as agitation of the reactants. Solvents such as water, benzene, toluene, chloroform, aqueous ethanol and the like, can be employed. When using derivatives containing the aldoxime, it is preferred to carry out the reaction in the presence of a hydrogen halide acceptor such as sodium carbonate, triethylamine, pyridine, picoline and the like, which are used as catalysts. Similarly, in the condensation reaction to prepare secondary carbamyl derivatives, the reaction is preferably conducted in the presence of a hydrogen halide acceptor.

The reactions are carried out at temperatures that permit operation in the liquid phase. These temperatures are between about room temperature and reflux temperature of the solvent, if one is employed. Preferably, the reaction mixture is refluxed, usually at an elevated temperature. The ketoxime can be reacted with functional moieties as described supra for the benzaldoxime.

It now has been discovered that the new compositions disclosed herein are distinguished as useful as insecticides, herbicides, folar fungi protectants and are particularly effective as systemic parasiticidal agents for animals.

The compounds of the present invention are prepared in accordance with the following illustrative examples.

EXAMPLE 1

Preparation of the intermediate 3-[O-(O,O-diethylphosphorothioyl)] benzaldehyde

In 200 ml. of methyl ethyl ketone in a 500 ml. 3-neck flask are combined 24.4 g. (0.2 mole) 3-hydroxybenzaldehyde, 37.8 g. (0.2 mole), O,O-diethylthiophosphorylchloride, and 16.4 g. (0.12 mole) potassium carbonate. The mixture is stirred and heated under reflux for 4 hours, cooled, and poured into 300 ml. of water. The mixture is filtered free of solid and is extracted with two 150 ml. portions of chloroform. The chloroform phases are combined, dried with anhydrous $MgSO_4$ and the solvent evaporated. There is obtained 54.7 g. (99.5 percent of theory) of the title intermediate, $n_D^{30}=1.5239$.

Preparation of 3-[O,O-diethylphosphorothioyl] benzaldoxime

In 300 ml. of water are combined 27.4 g. (0.1 mole) 3-[O-(O,O-diethylphosphorothioyl)] - benzaldehyde and 7.6 g. (0.1 mole) hydroxylamine hydrochloride. The mixture is stirred at room temperature, and 7.5 g. (0.06 mole) sodium carbonate monohydrate is added over a period of 20 min. The resulting mixture is stirred at room temperature for 1 hour. The mixture is extracted with 2–150 ml. portions of benzene. The benzene phases are combined, dried with anhydrous $MgSO_4$ and evaporated. There is obtained a yield of 20.0 g. (68.3% of theory) of the title compound, $n_D^{30}=1.5460$.

EXAMPLE 2

Preparation of 3-[O,O,O-diethylphosphorothioyl)]-benzaldoximino-N'-methyl carbamate Ten grams (0.034 mole) of 3-[O-(O-diethylphosphorothioyl)]-benzaldoxime dissolved in 10 ml. of acetone is treated with an excess of methylisocyanate. The mixture is poured into 200 ml. of benzene. The benzene is washed with 2–50 ml. portions of water, dried with anhydrous $MgSO_4$, and evaporated. There is obtained a yield of 11.2 g. (93.3 percent of theory) of the title compound, $n_D^{30}=1.5394$.

EXAMPLE 3

Preparation of 4-[O-(O,O-diethylphosphorothioyl)]-acetophenone oxime

In 150 ml. of 80 percent aqueous ethanol are combined 56.2 g. (0.195 mole) 4-[O-(O,O-diethylphosphorothioyl)]-acetophenone, 17.4 g. (0.25 mole) hydroxylamine hydrochloride, and 4 gms. (0.1 mole) sodium hydroxide. The mixture is heated and refluxed for 5 min., cooled, acidified with concentrated hydrochloride acid and extracted with two 150 ml. portions of chloroform. The chloroform phases are combined, dried with anhydrous $MgSO_4$, and evaporated. There is obtained 55.0 g. (93.5 percent of theory) of the title compound, $n_D^{30}=1.5393$.

EXAMPLE 4

Preparation of 4-[O-(O,O-diethylphosphorothioyl)]-acetophenoneoximino-N'-methyl carbamate By an analogous procedure as given in Example 2, supra, 10.0 g. (0.03 mole) of 4-[O-(O,O-diethylphosphorothioyl)]-acetophenoneoxime is reacted with methyl isocyanate. There was obtained 11.5 g. (96.9 percent of theory) of the title compound.

EXAMPLE 5

Preparation of 4-[O,O-diethylphosphorothioyl] acetophenoneoximino acetate

The following procedure also can be used with a carbamyl chloride, sulfonyl chloride or chloroformate in order to obtain compounds that include the respective functional moieties typical of said reactants.

In 150 ml. of benzene 10.0 g. (0.03 mole) of 4-[4-(O,O - diethylphosphorothioyl)] - acetophenoneoxime, 3.2 g. (0.04 mole) of acetylchloride, and 4.1 g. (0.04 mole) of triethylamine are combined. The mixture is heated and refluxed for about one hour. The cooled reaction mixture is washed with two 50 ml. portions of water. The benzene phase is dried with anhydrous magnesium sulfate and then the benzene evaporated. There is obtained 11.0 g. (96.5 percent of theory) of the title compound $n_D^{30}=1.5279$.

EXAMPLE 6

Preparation of 4-[O-(O,O-diethylphosphorothioyl)] benzaldoximino-N'-morpholinylcarbamate Seven grams (0.07 mole) of phosgene in 150 ml. of anhydrous diethyl ether is added to a 500 ml. 3-neck flask fitted with a stirrer, dropping funnel, Dry Ice condenser, and thermometer. The solution is stirred and cooled to 10° C. with an ice bath. N,N-dimethylaniline, 8.6 g. (0.07 mole) is added over a period of 30 minutes. 4-[O-(O,O-dieethylphosphorothioyl)] benzaldoxime, 14.5 g. (0.05 mole) in 50 ml. of anhydrous diethyl ether is added over a period of 30 minutes. The temperature of the reaction mixture is maintained between 10 and 15° C. After the addition is complete, the mixture is stirred for one hour at 15° C. A solution of 17.4 grams (0.2 mole) of morpholine and 10 ml. of water is added to the stirring reaction mixture at such a rate that the temperature does not exceed 15° C. After the addition is complete, the mixture is stirred for two hours at room temperature. The mixture is diluted with 200 ml. of ether and washed consecutively with 100 ml. of water, 100 ml. 1 N HCl, and again with 100 ml. of water. The ether phase is dried with anhydrous MgSO₄ and evaporated to yield 18 grams (89.8% of theory) of 4-[O-(O,O-diethylphosphorothioyl)] benzaldoximino-N'-morpholinylcarbamate, $n_D^{30}$=1.5423.

EXAMPLE 7

Preparation of 4-[O-(O,O-diethylphosphorothioyl)] benzaldoximino-N-(β-hydroxyethyl) carbamate Seven grams (0.07 mole) of phosgene, 8.6 grams (0.07 mole) of N,N-dimethylaniline and 14.5 grams (0.05 mole) of 4-[O-(O,O-diethylphosphorothioyl)] benzaldoxime are reacted in 200 ml. anhydrous diethyl ether by the procedure described in Example 6. The etherical solution is cooled to 10° C. and a solution of 6.1 grams (0.1 mole) of ethanolamine and 10 ml. of water is added at such a rate that the temperature does not exceed 15° C. After the addition is complete, the mixture is stirred at room temperature for one hour. The product is isolated by the procedure described in Example 6. There is obtained a 17.8 grams (94.8% of theory) of the title compound, $n_D^{30}$=1.5423.

EXAMPLE 8

Preparation of 4 - [O - (O,O - diethylphosphorothioyl)] benzaldoximino-N' [β - (N'',N'' - diethylamino)ethyl] carbamate Seven grams (0.07 mole) of phosgene, 8.6 grams (0.07 mole) of N,N-dimethylaniline, and 14.5 grams (0.05 mole) of 4-[O-(O,O-diethylphosphorothioyl)] benzaldoxime are reacted in 200 ml. of anhydrous diethyl ether by the procedure described in Example 6. The etherical solution is washed with 100 ml. of ice cold 1 N HCl and returned to the reaction flask where it is stirred and cooled to 10° C. A solution of 11.6 grams (0.1 mole) of β-N,N-diethyl ethylenediamine and 10 ml, of water is added to the etherical solution at such a rate that the temperature does not exceed 15° C. After the addition is complete, the mixture is stirred at room temperature for one hour. An additional 100 ml. of anhydrous diethyl ether is added, and the mixture is washed with 50 ml. of ice cold 1 N NaOH followed by two 50 ml. portions of water. The ether phase is dried with anhydrous MgSO₄ and evaporated. There is obtained 11.3 grams (51.8% of theory) of the title compound, $n_D^{30}$=1.5310.

The following is a table of the compounds prepared according to the aforedescribed procedures. Compound numbers have been assigned to each compound and are then used for identification throughout the balance of the application.

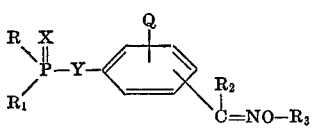

| Compound number | R | R₁ | X | Y | Q | (p)₁ | R₂ | R₃ | M.P. (° C.) $n_D^{30}$ |
|---|---|---|---|---|---|---|---|---|---|
| 1 | C₂H₅O | C₂H₅O | S | O | H | 3 | H | H | 1.5460 |
| 2 | C₂H₅O | C₂H₅O | S | O | H | 4 | H | H | 1.5520 |
| 3 | C₂H₅O | C₂H₅O | S | O | H | 3 | H | C(O)NHCH₃ | 1.5394 |
| 4 | C₂H₅O | C₂H₅O | S | O | H | 4 | H | C(O)NHCH₃ | ² 94–96 |
| 5 | C₂H₅O | C₂H₅O | S | O | H | 4 | H | C(O)NHCH₂CH=CH₂ | 1.5430 |
| 6 | C₂H₅O | C₂H₅O | S | O | H | 2 | H | H | 1.5406 |
| 7 | C₂H₅O | C₂H₅O | S | O | H | 4 | H | C(O)CH₃ | 1.5318 |
| 8 | C₂H₅O | C₂H₅O | S | O | H | 2 | H | C(O)NHCH₃ | 1.5354 |
| 9 | C₂H₅O | C₂H₅O | S | O | H | 2 | H | C(O)NHCH₂CH=CH₂ | 1.5330 |
| 10 | C₂H₅O | C₂H₅O | S | O | H | 4 | H | C(O)NH(CH₂)₃CH₃ | 1.5265 |
| 11 | C₂H₅O | C₂H₅O | S | O | H | 2 | H | C(OH)H—CCl₃ | 1.5458 |
| 12 | CH₃O | CH₃O | S | O | H | 4 | H | H | 1.5655 |
| 13 | CH₃O | CH₃O | S | O | H | 4 | H | C(O)NHCH₃ | 1.5538 |
| 14 | CH₃O | CH₃O | S | O | H | 3 | H | H | 1.5494 |
| 15 | CH₃O | CH₃O | S | O | H | 3 | H | C(O)NHCH₃ | 1.5400 |
| 16 | CH₃O | CH₃O | S | O | H | 3 | H | C(O)NHCH(CH₃)₂ | 1.5247 |
| 17 | CH₃O | CH₃O | S | O | H | 4 | H | C(O)NHCH(CH₃)₂ | 1.5427 |
| 18 | C₂H₅O | C₂H₅O | S | O | 2-CH₃O | 4 | H | H | 1.5410 |
| 19 | C₂H₅O | C₂H₅O | S | O | 2-CH₃O | 4 | H | C(O)NHCH₃ | 1.5436 |
| 20 | C₂H₅O | C₂H₅O | S | O | 2-CH₃O | 4 | H | C(O)NHCH₂CH=CH₂ | 1.5303 |
| 21 | CH₃O | CH₃O | S | O | 2-CH₃O | 4 | H | H | 1.5586 |
| 22 | CH₃O | CH₃O | S | O | 2-CH₃O | 4 | H | C(O)NHCH₃ | 1.5510 |
| 23 | C₂H₅O | C₂H₅O | S | O | H | 3 | CH₃ | H | 1.5348 |
| 24 | CH₃O | CH₃O | S | O | 2-CH₃O | 4 | H | C(O)NH—phenyl | 1.5670 |
| 25 | CH₃O | CH₃O | S | O | 2-CH₃O | 4 | H | C(O)NHCH(CH₃)₂ | 1.5328 |
| 26 | C₂H₅O | C₂H₅O | S | O | H | 3 | CH₃ | C(O)OC₂H₅ | 1.5094 |
| 27 | CH₃O | CH₃O | S | O | H | 3 | CH₃ | C(O)NHCH₃ | 1.5340 |
| 28 | CH₃O | CH₃O | S | O | H | 4 | CH₃ | H | 1.5592 |
| 29 | CH₃O | CH₃O | S | O | H | 4 | CH₃ | C(O)NHCH₃ | 1.5527 |
| 30 | C₂H₅O | C₂H₅O | S | O | H | 4 | CH₃ | H | 1.5393 |
| 31 | C₂H₅O | C₂H₅O | S | O | H | 4 | CH₃ | P(S)(OC₂H₅)₂ | (³) |
| 32 | C₂H₅O | C₂H₅O | S | O | H | 4 | CH₃ | C(O)NHCH₃ | 1.5382 |
| 33 | C₂H₅O | C₂H₅O | S | O | H | 4 | CH₃ | C(O)NHCH(CH₃)₂ | 1.5263 |
| 34 | CH₃O | CH₃O | S | O | H | 3 | CH₃ | C(O)NHCH₃ | 1.5195 |
| 35 | CH₃O | CH₃O | S | O | H | 3 | CH₃ | C(O)NHCH(CH₃)₂ | 1.5128 |
| 36 | C₂H₅O | C₂H₅O | S | O | H | 4 | CH₃ | C(O)NHC₄H₉-n | 1.5163 |
| 37 | CH₃O | CH₃O | S | O | 4-Br | 2 | H | C(O)NHCH₃ | 1.5665 |
| 38 | CH₃O | CH₃O | S | O | 4-Br | 2 | H | C(O)NHCH(CH₃)₂ | 1.5378 |
| 39 | C₂H₅O | C₂H₅O | S | O | 4-Br | 2 | H | C(O)NHCH₃ | 1.5486 |
| 40 | CH₃O | CH₃O | S | O | 4-Br | 2 | H | C(O)CH₃ | 1.5543 |
| 41 | C₂H₅O | C₂H₅O | S | O | 4-Br | 2 | H | C(O)CH₃ | 1.5410 |
| 42 | C₂H₅O | C₂H₅O | S | O | 6-NO₂ | 2 | H | C(O)NHCH₃ | 1.5413 |
| 43 | C₂H₅O | C₂H₅O | S | O | 6-NO₂ | 2 | H | C(O)NHCH₂CH=CH₂ | 1.5397 |
| 44 | C₂H₅O | C₂H₅O | S | O | 6-NO₂ | 2 | H | C(O)CH₃ | 1.5306 |
| 45 | C₂H₅O | C₂H₅O | S | O | 6-NO₂ | 2 | H | C(O)OC₂H₅ | 1.5085 |
| 46 | C₂H₅O | C₂H₅O | S | O | 4-Br | 2 | H | C(O)NHC₄H₉ | 1.5384 |
| 47 | C₂H₅O | C₂H₅O | S | O | H | 4 | CH₃ | C(O)NHCH₃ | 1.5502 |
| 48 | C₂H₅O | C₂H₅O | S | O | H | 4 | CH₃ | H | 1.5279 |
| 49 | C₂H₅O | C₂H₅O | S | C₂H₅ | H | 4 | CH₃ | C(O)NHCH(CH₃)₂ | 1.5384 |
| 50 | C₂H₅O | C₂H₅ | S | O | H | 4 | CH₃ | C(O)NHCH₂(CH₂)₂CH₃ | 1.5372 |
| 51 | C₂H₅O | C₂H₅ | S | O | H | 4 | CH₃ | C(O)OC₂H₅ | 1.5117 |
| 52 | C₂H₅O | C₂H₅ | S | O | H | 4 | CH₃ | C(O)CH₃ | 1.5360 |
| 53 | C₂H₅O | C₂H₅O | S | O | H | 4 | CH₃ | S(O)₂CH₂CH(CH₃)₂ | 1.5208 |
| 54 | C₂H₅O | C₂H₅ | S | O | H | 4 | H | C(O)NHCH₃ | 1.5525 |
| 55 | C₂H₅O | C₂H₅ | S | O | H | 4 | H | C(O)NH-3-chlorophenyl | 1.5828 |
| 56 | C₂H₅O | C₂H₅ | S | O | H | 4 | H | C(O)NHCH₂CH=CH₂ | 1.5461 |

TABLE—Continued

| Compound number | R | R₁ | X | Y | Q | (p)₁ | R₂ | R₃ | M.P. (° C.) $n_D^{30}$ |
|---|---|---|---|---|---|---|---|---|---|
| 57 | CH₃O | CH₃O | S | O | 6-NO₂ | 2 | H | C(O)NHCH₃ | (4) |
| 58 | CH₃O | CH₃O | S | O | 6-NO₂ | 2 | H | C(O)NHCH₂CH=CH₂ | 1.5503 |
| 59 | C₂H₅O | C₂H₅O | S | O | 3-CH₃ | 4 | CH₃ | C(O)NHCH₃ | 104–106 |
| 60 | C₂H₅O | C₂H₅O | S | O | 3-CH₃ | 4 | CH₃ | C(O)NHC₄H₉ | 1.5110 |
| 61 | C₂H₅O | C₂H₅O | S | O | 3-CH₃ | 4 | CH₃ | C(O)CH₃ | 1.5221 |
| 62 | C₂H₅O | C₂H₅O | S | O | 2-CH₃O | 4 | CH₃ | C(O)NHCH₃ | 1.5347 |
| 63 | C₂H₅O | C₂H₅O | S | O | 2-CH₃O | 4 | CH₃ | C(O)NHC₄H₉ | 1.5280 |
| 64 | C₂H₅O | C₂H₅O | S | O | 2-Cl | 4 | H | C(O)NHCH₃ | 1.5456 |
| 65 | C₂H₅O | C₂H₅O | S | O | 2-Cl | 4 | H | C(O)NHC₄H₉ | 1.5288 |
| 66 | C₂H₅O | C₂H₅O | S | O | H | 4 | H | C(O)N(CH₃)₂ | 1.5330 |
| 67 | C₂H₅O | C₂H₅O | O | O | H | 4 | H | C(O)NHCH₃ | 1.5280 |
| 68 | C₂H₅O | C₂H₅O | O | O | H | 4 | H | C(O)NHC₄H₉ | 1.5130 |
| 69 | C₂H₅O | C₂H₅O | O | O | H | 4 | CH₃ | C(O)NHCH₃ | 1.5243 |
| 70 | C₂H₅O | C₂H₅O | O | O | H | 4 | CH₃ | C(O)NHCH(CH₃)₂ | 1.5109 |
| 71 | C₂H₅O | C₂H₅O | S | O | 3-OP(S)(OC₂H₅)₂ | 4 | H | C(O)CH=CHCH₃ | 1.5325 |
| 72 | C₂H₅O | C₂H₅O | S | O | H | 4 | H | C(O)NHCH₃ | 1.5355 |
| 73 | C₂H₅O | C₂H₅O | S | O | 3-OP(S)(OC₂H₅)₂ | 4 | H | C(O)NH₂ | 1.5355 |
| 74 | C₂H₅O | C₂H₅O | S | O | 3-OP(S)(OC₂H₅)₂ | 4 | H | C(O)NHCH=CHCH₃ | 1.5298 |
| 75 | C₂H₅O | C₂H₅O | S | O | H | 4 | H | C(O)-n-C₄H₉ | 1.5210 |
| 76 | C₂H₅O | C₂H₅O | S | O | H | 4 | H | C(O)NH-i-C₅H₁₁ | 1.5243 |
| 77 | C₂H₅O | C₂H₅O | S | O | H | 4 | H | C(O)NH-i-C₄H₉ | 1.5232 |
| 78 | C₂H₅O | C₂H₅O | S | O | H | 4 | H | C(O)-n-C₄H₉ | 1.4900 |
| 79 | C₂H₅O | C₂H₅O | S | O | 2-CH₃ | 4 | CH₃ | C(O)NHCH₃ | 1.5400 |
| 80 | C₂H₅O | C₂H₅O | S | O | 2-CH₃ | 4 | CH₃ | C(O)NHCH(CH₃)₂ | 1.5312 |
| 81 | C₂H₅O | C₂H₅O | S | O | 2-CH₃ | 4 | CH₃ | C(O)-n-C₄H₉ | 1.5257 |
| 82 | C₂H₅O | C₂H₅O | S | O | 3,4-tetramethylenediene-1′,3′ | 2 | H | C(O)NHCH₃ | 1.5086 |
| 83 | C₂H₅O | C₂H₅O | S | O | 3,4-tetramethylenediene-1′,3′ | 2 | H | C(O)NH-n-C₄H₉ | (4) |
| 84 | C₂H₅O | C₂H₅O | S | O | H | 4 | H | C(O)NH-n-C₃H₇ | 1.5268 |
| 85 | C₂H₅O | C₂H₅O | S | O | H | 4 | H | C(O)NH-n-C₆H₁₃ | 1.5209 |
| 86 | C₂H₅O | C₂H₅O | S | O | H | 4 | CH₃ | C(O)NH₂ | 1.5393 |
| 87 | C₂H₅O | C₂H₅O | S | O | H | 4 | CH₃ | C(O)N(CH₃)₂ | 1.5342 |
| 88 | C₂H₅O | C₂H₅O | S | O | H | 4 | CH₃ | C(O)SCH₃ | 1.5432 |
| 89 | C₂H₅O | C₂H₅O | S | O | 2-Cl | 4 | CH₃ | C(O)NHCH₃ | 1.5458 |
| 90 | C₂H₅O | C₂H₅O | S | O | 2-Cl | 4 | CH₃ | C(O)NHCH=CHCH₃ | 1.5460 |
| 91 | C₂H₅O | C₂H₅O | S | O | H | 4 | H | C(O)NH-3-chlorophenyl | 1.5703 |
| 92 | C₂H₅O | C₂H₅O | S | O | H | 4 | H | C(O)NH-3-nitrophenyl | 1.5595 |
| 93 | C₂H₅O | C₂H₅O | S | O | H | 4 | H | C(O)NHC₂H₅ | 1.5303 |
| 94 | C₂H₅O | C₂H₅O | S | O | H | 4 | CH₃ | C(O)NHC₂H₅ | 1.5323 |
| 95 | C₂H₅O | C₂H₅O | S | O | H | 4 | C₂H₅ | C(O)NHCH₃ | 1.5384 |
| 96 | C₂H₅O | C₂H₅O | S | O | H | 4 | C₂H₅ | C(O)NH-n-C₃H₇ | 1.5285 |
| 97 | C₂H₅O | C₂H₅O | S | O | H | 4 | C₂H₅ | C(O)NHCH₂CH=CH₂ | 1.5370 |
| 98 | C₂H₅O | C₂H₅O | S | O | H | 4 | nC₃H₇ | C(O)NHCH₃ | 1.5348 |
| 99 | C₂H₅O | C₂H₅O | S | O | H | 4 | nC₃H₇ | C(O)NHCH(CH₃)₂ | 1.5223 |
| 100 | C₂H₅O | C₂H₅O | S | O | H | 4 | nC₃H₇ | C(O)NH-n-C₄H₉ | 1.5223 |
| 101 | C₂H₅O | C₂H₅O | S | O | H | 4 | H | C(O)NH-3-chloro-4-methylphenyl | 1.5494 |
| 102 | C₂H₅O | C₂H₅O | S | O | H | 4 | CH₃ | C(O)OCH₂CH₂Cl | 1.5210 |
| 103 | C₂H₅O | C₂H₅O | S | O | H | 4 | CH₃ | C(O)O-n-C₄H₉ | 1.5009 |
| 104 | C₂H₅ | C₂H₅O | S | O | H | 4 | H | C(O)NH-3,4-dichlorophenyl | 1.5915 |
| 105 | C₂H₅ | i-C₄H₉O | S | O | H | 4 | H | C(O)NHCH₃ | 1.5318 |
| 106 | C₂H₅ | i-C₄H₉O | S | O | H | 4 | H | C(O)NHCH₂CH=CH₂ | 1.5280 |
| 107 | C₂H₅ | i-C₄H₉O | S | O | H | 4 | H | C(O)NH-3-chlorophenyl | 1.5495 |
| 108 | C₂H₅ | i-C₄H₉O | S | O | H | 4 | H | C(O)NH-4-bromophenyl | 1.5573 |
| 109 | C₂H₅O | C₂H₅ | S | O | H | 4 | H | C(O)NH-n-C₄H₉ | 1.5367 |
| 110 | C₂H₅O | C₂H₅ | S | O | H | 4 | H | C(O)NHCH(CH₃)₂ | 1.5327 |
| 111 | C₂H₅O | C₂H₅ | S | O | H | 4 | H | C(O)NH-n-C₈H₁₇ | 1.5206 |
| 112 | C₂H₅O | C₂H₅O | S | O | H | 4 | H | C(O)NH-4-nitrophenyl | 120–126 |
| 113 | C₂H₅O | C₂H₅O | S | O | H | 4 | H | C(O)NH-4-methylphenyl | 78–80 |
| 114 | C₂H₅O | C₂H₅O | S | O | H | 4 | H | C(O)NH-3,4-dichlorophenyl | 103–105 |
| 115 | C₂H₅O | C₂H₅O | S | O | H | 4 | H | C(O)NH-2,5-dichlorophenyl | 109–110 |
| 116 | C₂H₅O | C₂H₅O | S | O | H | 4 | CH₃ | C(O)NH-3-chlorophenyl | 1.5553 |
| 117 | C₂H₅O | C₂H₅O | S | O | H | 4 | CH₃ | C(O)NH-4-methylphenyl | 1.5458 |
| 118 | C₂H₅O | C₂H₅O | S | O | H | 4 | H | C(O)NH-t-C₄H₉ | 1.5296 |
| 119 | C₂H₅O | C₂H₅O | S | O | H | 4 | H | C(O)NHCH₂C(O)OC₂H₅ | 1.4958 |
| 120 | C₂H₅O | C₂H₅O | S | O | H | 4 | H | C(O)NH-2-ethoxyphenyl | 102–105 |
| 121 | C₂H₅O | C₂H₅O | S | O | H | 4 | H | C(O)NH-4-methoxyphenyl | 90–92 |
| 122 | C₂H₅O | C₂H₅O | S | O | H | 4 | H | C(O)NH-phenyl | 1.5606 |
| 123 | C₂H₅O | C₂H₅O | S | O | H | 4 | H | C(O)NH-α-naphthyl | 95–97 |
| 124 | C₂H₅O | C₂H₅O | S | O | H | 4 | H | C(O)NH-4-chloro-3-methylphenyl | 1.5608 |
| 125 | C₂H₅ | C₂H₅ | S | O | H | 4 | H | H | 1.5900 |
| 126 | C₂H₅ | C₂H₅O | S | O | H | 4 | H | C(O)NHCH₃ | (4) |
| 127 | C₂H₅O | C₂H₅O | S | O | 3-CH₃ | 4 | H | C(O)NHCH₃ | 1.5422 |
| 128 | C₂H₅O | C₂H₅O | S | O | H | 4 | H | 4-cyanophenyl | 90–95 |
| 129 | C₂H₅O | C₂H₅O | S | O | H | 4 | H | 2,4,5-trichlorophenyl | 126–130 |
| 130 | C₂H₅O | C₂H₅O | S | O | H | 4 | H | 4-methylthiophenyl | 1.5717 |
| 131 | C₂H₅O | C₂H₅O | S | O | H | 4 | phenyl | H | 1.6057 |
| 132 | C₂H₅O | C₂H₅O | S | O | H | 4 | phenyl | C(O)NHCH₃ | 1.5496 |
| 133 | C₂H₅O | C₂H₅O | S | O | H | 4 | CH₃ | C(O)—N—CH₃—piperazino | 1.5290 |
| 134 | C₂H₅O | C₂H₅O | S | O | H | 4 | CH₃ | C(O)—pyrrolidino | 1.5487 |
| 135 | C₂H₅O | C₂H₅O | S | O | H₁ | 4 | CH₃ | C(O)—piperadino | 1.5476 |
| 136 | C₂H₅O | C₂H₅O | S | O | H | 4 | CH₃ | C(O)—morpholino | 1.5458 |
| 137 | C₂H₅O | C₂H₅O | S | O | H | 4 | H | C(O)—morpholino | 1.5423 |
| 138 | C₂H₅O | C₂H₅O | S | O | H | 4 | H | C(O)—pyrrolidino | 1.5398 |
| 139 | C₂H₅O | C₂H₅O | S | O | 3-CH₃ | 4 | CH₃ | C(O)—piperadino | 1.5300 |
| 140 | C₂H₅O | C₂H₅O | S | O | H | 4 | CH₃ | C(O)—hexamethylenimino | 1.5422 |
| 141 | C₂H₅O | C₂H₅O | S | O | H | 4 | H | C(O)—hexamethylenimino | 1.5430 |
| 142 | C₂H₅O | C₂H₅ | S | O | H | 4 | H | C(O)—morpholino | 1.5525 |
| 143 | C₂H₅O | C₂H₅ | S | O | H | 4 | H | C(O)—piperadino | 1.5475 |
| 144 | C₂H₅O | C₂H₅O | S | O | H | 4 | CH₃ | C(O)N(CH₃)cyclohexyl | 1.5430 |
| 145 | C₂H₅O | C₂H₅O | S | O | H | 4 | CH₃ | C(O)N(C₂H₅)CH₂CH₂OH | 1.5420 |
| 146 | C₂H₅O | C₂H₅O | S | O | H | 4 | CH₃ | C(O)N(CH₃)tetrahydrofurfuryl | 1.5392 |
| 147 | C₂H₅O | C₂H₅O | S | O | H | 4 | CH₃ | C(O)NH-2-thiazolyl | 124–125 |
| 148 | C₂H₅O | C₂H₅ | S | O | H | 4 | CH₃ | C(O)N(CH₂CH₂OCH₃)₂ | 1.5289 |
| 149 | C₂H₅O | C₂H₅O | S | O | H | 4 | H | C(O)NH—cyclohexyl | 1.5355 |
| 150 | C₂H₅O | C₂H₅O | S | O | 3-CH₃ | 4 | CH₃ | C(O)N(C₂H₅)C₂H₅OH | 1.5272 |
| 151 | C₂H₅O | C₂H₅O | S | O | H | 4 | H | C(O)NHC₂H₅OH | 1.5423 |
| 152 | C₂H₅O | C₂H₅O | S | O | H | 4 | H | C(O)NH(N,N-diethylaminoethyl) | 1.5310 |
| 153 | C₂H₅O | CH₃HN | S | O | H | 4 | H | C(O)NHCH₃ | 1.5647 |
| 154 | C₂H₅O | CH₃HN | S | O | H | 4 | H | C(O)NH-3-chlorophenyl | 1.5875 |
| 155 | C₂H₅O | H₂N | S | O | H | 4 | H | C(O)NHCH₃ | 1.5750 |
| 156 | C₂H₅O | C₂H₅O | S | O | H | 4 | CH₃ | C(O)N(C₂H₅)₂ | 1.5314 |
| 157 | C₂H₅O | C₂H₅O | S | O | H | 4 | H | C(O)NH-3-CH₃S—phenyl | 1.5952 |
| 158 | C₂H₅O | C₂H₅O | S | O | H | 4 | CH₃ | C(O)NH-3-CH₃S—phenyl | 1.5640 |
| 159 | C₂H₅O | C₂H₅O | S | O | H | 4 | CH₃ | C(O)NH-2,4,5-triCl—phenyl | 109–111 |
| 160 | C₂H₅O | C₂H₅O | S | O | H | 4 | CH₃ | C(O)N(CH₂CH=CH₂)₂ | 1.5404 |
| 161 | CH₃O | CH₃O | S | O | H | 4 | H | C(O)NH-3-Cl—phenyl | 1.5530 |
| 162 | CH₃O | CH₃O | S | O | H | 4 | CH₃ | C(O)NH-3-CH₃S—phenyl | 1.5938 |
| 163 | C₂H₅O | C₂H₅O | S | O | H | 4 | CH₃ | C(O)CH₂CH=CH₂ | 1.5370 |

TABLE—Continued

| Compound number | R | $R_1$ | X | Y | Q | (p)[1] | $R_2$ | $R_3$ | M.P. (°C) $n_D^{30}$ |
|---|---|---|---|---|---|---|---|---|---|
| 164 | $C_2H_5O$ | $C_2H_5O$ | S | O | H | 4 | $CH_3$ | $C(O)OCCl_3$ | 1.5343 |
| 165 | $C_2H_5O$ | $C_2H_5O$ | S | O | 2-Cl | 4 | H | $C(O)NH$-3-Cl—phenyl | 1.5723 |
| 166 | $C_2H_5O$ | $C_2H_5O$ | S | O | H | 4 | $CH_3$ | $C(O)$-t-$C_4H_9$ | 1.5147 |
| 167 | $CH_3O$ | $CH_3O$ | S | O | H | 4 | H | $C(O)NH$-$C_4H_9$ | 1.5282 |
| 168 | $CH_3O$ | $CH_3O$ | S | O | H | 4 | H | $C(O)NH$-3,4-di-Cl—phenyl | 1.5720 |
| 169 | $CH_3O$ | $CH_3O$ | S | O | H | 4 | H | $C(O)NH$-4-Br—phenyl | 116–118 |
| 170 | $C_2H_5O$ | $C_2H_5O$ | S | O | H | 4 | $CH_3$ | $C(O)NH(C_3H_{17})$ | 1.5216 |
| 171 | $C_2H_5O$ | $C_2H_5$ | S | O | H | 4 | H | $C(O)NHCH_2C(O)OC_2H_5$ | 1.5253 |
| 172 | $C_2H_5O$ | $C_2H_5$ | S | O | H | 4 | H | $C(O)NH$-4-$CH_3S$—phenyl | 1.5832 |
| 173 | $CH_3O$ | $CH_3O$ | S | O | H | 4 | H | $C(O)NH_2$ | 1.5666 |
| 174 | $CH_3O$ | $CH_3O$ | S | O | H | 4 | H | $C(O)N(CH_3)_2$ | 97–99 |
| 175 | $C_2H_5O$ | $C_2H_5O$ | S | O | 3-$CH_3$ | 4 | $CH_3$ | $C(O)NH(i$-$C_3H_7)$ | 1.5169 |
| 176 | $C_2H_5O$ | $C_2H_5O$ | S | O | 3-$CH_3$ | 4 | $CH_3$ | $C(O)NH(CH_2CH=CH_2)$ | 1.5293 |
| 177 | $C_2H_5O$ | $C_2H_5O$ | S | O | 3-$CH_3$ | 4 | $CH_3$ | $C(O)NH_2$ | 1.5312 |
| 178 | $C_2H_5O$ | $C_2H_5O$ | S | O | 3-$CH_3$ | 4 | $CH_3$ | $C(O)N(CH_3)_2$ | 1.5270 |
| 179 | $CH_3O$ | $CH_3O$ | S | O | H | 4 | H | $C(O)NH$-3-$CH_3S$—phenyl | 1.6090 |
| 180 | $CH_3O$ | $CH_3O$ | S | O | H | 4 | H | $C(O)NH(C_3H_7)$ | 1.5425 |
| 181 | $CH_3O$ | $CH_3O$ | S | O | H | 4 | H | $C(O)NH$-4-Br—phenyl | [5] |
| 182 | $C_2H_5O$ | $C_2H_5O$ | S | O | 3-$CH_3$ | 4 | $CH_3$ | $C(O)N(CH_3)(phenyl)$ | 1.5574 |
| 183 | $C_2H_5O$ | $C_2H_5O$ | S | O | 3-$CH_3$ | 4 | $CH_3$ | $C(O)N(C_2H_5)_2$ | 1.5186 |
| 184 | $C_2H_5O$ | $C_2H_5O$ | S | O | 3-$CH_3$ | 4 | $CH_3$ | $C(O)N(CH_2CH=CH_2)_2$ | 1.5128 |
| 185 | $C_2H_5$ | $C_2H_5$ | S | O | H | 4 | H | $C(O)NH(C_4H_9)$ | 1.5564 |
| 186 | $C_2H_5$ | $C_2H_5$ | S | O | H | 4 | H | $C(O)NH(CH_2CH=CH_2)$ | 1.5777 |
| 187 | $C_2H_5$ | $C_2H_5$ | S | O | H | 4 | H | $C(O)NH$-3-$CH_3S$—phenyl | 1.6105 |
| 188 | $C_2H_5$ | $C_2H_5$ | S | O | H | 4 | H | $C(O)NH$-4-Br—phenyl | 1.5998 |
| 189 | $C_2H_5O$ | $C_2H_5O$ | S | O | H | 4 | H | $C(O)NH$-4-Br—phenyl | 94–99 |
| 190 | $C_2H_5O$ | $C_2H_5O$ | S | O | H | 4 | H | $C(O)NH(iC_3H_7)$ | 1.5274 |
| 191 | $C_2H_5$ | $C_2H_5$ | S | O | H | 4 | H | $C(O)CH_2$-4-Cl—phenyl | 1.6077 |
| 192 | $C_2H_5O$ | $C_2H_5O$ | S | O | H | 4 | H | $C(O)CH_2S$-4-Cl—phenyl | 1.5703 |
| 193 | $C_2H_5O$ | $C_2H_5O$ | S | O | H | 4 | H | $C(O)NH$-3-$CF_3$—phenyl | 1.358 |
| 194 | $C_2H_5O$ | $C_2H_5O$ | S | O | 3-$NO_2$ | 4 | H | $C(O)NH(CH_3)$ | 1.5455 |
| 195 | $C_2H_5$ | $C_2H_5$ | S | O | H | 4 | $CH_3$ | $C(O)NH(CH_3)$ | 1.5752 |
| 196 | $C_2H_5O$ | $C_2H_5O$ | S | O | 3-$NO_2$ | 4 | H | $C(O)NH(3$-$CH_3S$—phenyl) | 1.5833 |
| 197 | $C_2H_5O$ | $C_2H_5O$ | S | O | 3-$NO_2$ | 4 | H | $C(O)NH(CH_2CH=CH_2)$ | 1.5463 |
| 198 | $C_2H_5$ | $C_2H_5$ | S | O | H | 4 | $CH_3$ | $C(O)NH(C_4H_9)$ | 1.5493 |
| 199 | $C_2H_5$ | $C_2H_5$ | S | O | H | 4 | $CH_3$ | $C(O)NH(3$-$CF_3$—phenyl) | 1.5632 |
| 200 | $C_2H_5O$ | $C_2H_5$ | S | O | H | 4 | H | $C(O)NH(3$-$CF_3$—phenyl) | 1.5507 |

[1] (p) = position of phenyl substitution by $[-\overset{R_2}{\underset{|}{C}}=NO-R_3]$ relative to the phosphorus containing group.
[2] Dec.
[3] Dark oil.
[4] Semi-solid
[5] Waxy solid.

HERBICIDAL SCREENING TESTS

Novel compositions are phytotoxic compounds which are useful and valuable in controlling various plant species.

In the method of the present invention for controlling undesirable plants which comprises applying an herbicidally effective amount of the above-described compounds to the area in which control is desired, an herbicide is used to mean a compound which controls or modifies the growth of plants. By an "herbicidally effective amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation including the roots and above-ground portions.

The compounds of this invention were tested as herbicides in the following manner.

Pre-emergence herbicide test.

The seeds of crab grass (CG) (*Digitaria sanguinalis* (L.) Scop.), foxtail (Ft) (*Setaria glauca* (L.) Beauv.), watergrass (WG) (*Echinochloa crusgalli* (L.) Beauv.), pigweed (PW) (*Amaranthus retroflexus* (L.), mustard (Md) (*Brassica juncea* (L.) Coss.), and curly dock (CD) (*Rumex crispus* (L.)), were planted in individual rows one-half inch deep in Santa Cruz sandy loam soil contained in compressed paper flats 8¼" x 6½", which are 2¾" deep. Enough seeds were planted to give about thirty to fifty plants of each of the weed species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

Post-emergence herbicide test

The seeds of four weed species, crab grass (CG) (*Digitaria sanguinalis* (L.) Scop.), watergrass (WG) (*Echinochloa crusgalli* (L.) Beauv.), red oats (RO) (*Avena sativa* (L.)), mustard (Md) (*Brassica juncea* (L.) Coss.), and one crop, pinto beans (PB) (*Phaseolus vulgaris*) were planted in individual rows as described in the pre-emergence test, supra. Two weeks after planting, the plant foliage was sprayed with a 0.5% solution of the test compounds at a rate equivalent to 12.5 pounds/acre. The treated plants were placed back in the greenhouse. Injury ratings were recorded 14 days after treatment. The rating system is the same as that used in the pre-emergence test. Table III lists the results obtained therefrom.

TABLE II.—PRE-EMERGENCE HERBICIDE TEST*

| Compound number | CG | Ft | WG | PW | Mt | CD |
|---|---|---|---|---|---|---|
| 5 | | | | ++ | + | |
| 10 | + | | | +++ | +++ | |
| 11 | + | ++ | +++ | +++ | | |
| 12 | + | | ++ | | | |
| 15 | | | | | +++ | |
| 17 | + | | | +++ | +++ | |
| 25 | | | | | | +++ |
| 36 | | | | +++ | +++ | +++ |
| 38 | +++ | ++ | ++ | | + | + |
| 41 | | | | +++ | ++ | |
| 42 | ++ | | | | | |
| 43 | | | | | ++ | ++ |
| 46 | | +++ | | +++ | ++ | ++ |
| 47 | | +++ | | +++ | +++ | + |
| 48 | ++ | + | + | +++ | +++ | |
| 49 | | | | ++ | +++ | |
| 50 | | | | | + | |
| 52 | | | | | ++ | |
| 54 | +++ | | | ++ | ++ | |
| 55 | +++ | | | | | |
| 56 | ++ | | | ++ | +++ | + |
| 57 | | | | ++ | | |
| 58 | | | | +++ | +++ | ++ |
| 60 | | | | ++ | | |
| 65 | +++ | | + | +++ | +++ | +++ |
| 68 | + | | | | | |
| 71 | | | | ++ | ++ | |
| 137 | | + | | ++ | ++ | |
| 138 | +++ | +++ | +++ | +++ | + | |
| 140 | | | | | + | |
| 141 | +++ | +++ | +++ | +++ | +++ | + |
| 142 | | | | | | |

* Herbicidal activity rating:
+ = Slight injury.
++ = Moderate injury.
+++ = Severe injury or death.

TABLE III.—POST-EMERGENCE HERBICIDE TEST*

| Compound Number | CG | WG | RO | Md | PB |
|---|---|---|---|---|---|
| 1 |  | + |  | +++ | ++ |
| 3 | ++ | + | + | +++ | +++ |
| 2 | +++ | + | + | +++ | +++ |
| 4 | +++ | ++ | ++ | +++ | +++ |
| 5 | +++ | ++ | +++ | +++ | +++ |
| 6 | +++ | ++ | ++ | +++ | + |
| 7 | +++ |  |  | +++ |  |
| 8 | ++ |  |  | + | +++ |
| 9 | ++ |  |  |  | +++ |
| 10 | +++ | + | ++ | +++ | +++ |
| 11 | + | ++ |  |  | +++ |
| 12 | +++ | + | + | + | +++ |
| 13 |  |  |  |  | +++ |
| 14 | +++ |  |  | +++ | + |
| 15 | + |  |  | ++ | + |
| 16 | + | + | + |  | +++ |
| 17 | +++ | + | + | ++ | +++ |
| 18 | ++ |  |  |  | + |
| 20 | + |  |  |  | ++ |
| 21 | +++ | + | + | +++ |  |
| 23 | +++ |  |  | +++ | ++ |
| 24 | ++ |  |  | ++ | +++ |
| 25 | ++ | + | + | +++ | +++ |
| 27 | ++ |  |  | ++ |  |
| 28 | +++ | +++ | + | +++ | ++ |
| 29 | ++ |  |  | +++ | ++ |
| 30 | +++ | + | + | +++ |  |
| 32 | ++ |  |  | ++ | +++ |
| 33 | +++ |  |  | +++ | +++ |
| 36 | +++ |  |  | +++ | +++ |
| 37 | +++ |  |  | +++ | +++ |
| 38 | ++ |  |  | ++ | +++ |
| 39 | ++ |  |  | +++ |  |
| 40 | ++ | ++ |  | ++ | ++ |
| 41 | ++ |  |  | ++ | +++ |
| 42 | ++ |  |  | ++ |  |
| 43 | +++ |  |  | +++ | ++ |
| 46 | ++ |  |  |  |  |
| 47 | +++ | ++ | ++ | +++ | +++ |
| 48 | +++ | + |  | +++ |  |
| 49 | +++ |  |  | +++ | +++ |
| 50 | +++ |  |  | +++ | +++ |
| 52 | +++ |  |  | +++ | +++ |
| 54 | +++ |  |  | +++ | +++ |
| 55 | +++ |  |  | +++ | +++ |
| 56 | +++ |  |  | +++ | +++ |
| 57 | +++ | ++ | ++ | +++ | +++ |
| 58 | +++ | +++ |  | +++ | +++ |
| 60 | +++ |  |  |  | +++ |
| 61 | +++ |  |  | ++ |  |
| 62 |  |  |  |  |  |
| 65 | +++ |  |  | +++ |  |
| 66 | + | ++ |  |  |  |
| 68 | ++ |  |  | +++ |  |
| 133 | ++ |  |  | +++ |  |
| 134 | + |  |  | +++ | +++ |
| 135 | + |  |  | +++ | + |
| 136 |  |  |  | +++ |  |
| 137 | ++ |  |  | +++ | + |
| 138 | + |  |  | ++ |  |
| 139 | +++ |  |  | +++ | ++ |
| 140 | ++ |  |  | ++ |  |
| 141 | +++ | ++ | + | +++ | +++ |
| 142 | +++ |  | ++ | +++ | +++ |

* Herbicidal activity rating:
+ = slight injury.
++ = moderate injury.
+++ = severe injury or death.

The compounds of the present invention are used as pre-emergence or post-emergence herbicides and are applied in a variety of ways at various concentrations. In practice, the compounds are formulated with an inert carrier, utilizing methods well known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½ inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied on the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Phytotoxicants useful in combination with the above-described compounds include for example 2,4-dichlorophenoxyacetic acids, 2,4, 5-trichlorophenoxyacetic acid, 2-methyl - 4 - chlorophenoxyacetic acid and the salts, esters and amides thereof; triazine derivatives, such as 2,4-bix(3-methoxy-propylamino)-6-methylthio - S - triazine; 2-chloro - 4 - ethylamino-6-isopropylamino - S - triazine, and 2-ethylamino-4-isopropylamino - 6 - methylmercapto - S - triazine; urea derivatives, such as 3-(3,4-dichlorophenyl - 1,1 - dimethyl urea and 3-(p-chlorophenyl) - 1,1 - dimethyl urea, and acetamides such as N,N-diallyl-α-chloroacetamide, N-(α-chloroacetyl)hexamethylene imine, and N,N-diethyl-α-bromoacetamide, and the like; benzoic acids such as 3-amino-2,5-dichlorobenzoic and; thiocarbamates, such as S-propyl dipropylthiocarbamate; S-ethyldipropylthiocarbamate, S-ethyl-cyclohexylethylthiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow such as compost, manure, humus, sand and the like.

The compositions of the present invention were tested as foliage fungicides. This test indicated protectant action against fungi attacking plant foilage. Pinto bean plants were sprayed with three concentrations of dissolved or suspended chemical in water, 1000, 500 and 100 parts per million (p.p.m.). The active compound was dissolved in an appropriate solvent and further dispersed in water, and for this purpose a surface active agent or wetting agent was employed to facilitate formulation of the dispersions. After the sprayed plants were dried, they were inoculated with powdery mildew spores (*Erysiphe polygoni*). Results were read when disease symptoms were distinct on untreated bean plants. Compound numbers 84 and 86 exhibited 75–99% control at 100 p.p.m. nad compound number 85 exhibited 100% control at 100 p.p.m. of the powdery mildew infection with no phytotoxicity.

Insecticidal evaluation tests

The following insect species were subjected to evaluation tests for insecticidal activity:
(1) Housefly (HF)—*Musca domestica* (Linn.)
(2) German roach (GR)—*Blattella germanica* (Linn.)
(3) Salt-marsh caterpillar (SMC)—*Estigmene acrea* (Drury)
(4) Milkweed bug (MWB)—*Oncopeltus fasciatus* (Dallas)
(5) Lygus bug (LB)—*Lygus hesperus* (Knight)

Aliquots of the toxicants, dissolved in an appropriate solvent, were diluted in water containing 0.002% of a wetting agent, Sponto 221® (a polyoxyether of alkylated phenols blended with organic sulfonates). Test concentrations ranged from 0.1% downward to that at which 50% mortality was obtained. In the tests, for these species, 10 one-month old nymphs of the German cockroach and Lygus bug and two-week old nymphs of milkweed bug were placed in separate circular cardboard cages sealed on one end with cellophane and covered by a cloth netting on the other. Test concentrations for the Lygus bug ranged from 0.05% downward to that at which 50% mortality was obtained. Each of the aqueous suspensions of the candidate compounds were sprayed onto the insects through the cloth netting by means of a hand spray gun. Percent mortality in each case recorded after 72 hours and the LD-50 values expressed as percent of toxicant in the aqueous spray was recorded.

For testing the Salt Marsh Caterpillar, test solutions were prepared in an identical manner and at concentrations the same as for the German cockroach and the milkweed bug above. Sections of bitter dock (*Rumex obtusifolus*) leaves, 1–1.5 inches in length were immersed in the test solutions for 10 to 15 seconds and placed on a wire screen to dry. The dried leaf was placed on a moistened piece of filter paper in a Petri dish and infested with 5–3rd Instar larvae. Mortality of the larvae was recorded after 72 hours and the LD-50 values are expressed as percent active ingredient in the aqueous suspension.

The following procedure was used to test houseflies. A stock solution containing 100 μg./ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg. per Petri dish to that at which 50% mortality was attained. The Petri dishes were placed in a circular cardboard cage, closed on the bottom with cellophane and covered on top with cloth netting. Twenty-five female houseflies were introduced into the cage and the percent mortality was recorded after 48 hours. The LD-50 values are expressed in terms of μg. per 25 female flies. The result of these insecticidal evaluation tests are given in Table IV.

TABLE IV.—(LD-50 VALUES)

| Compound Number | HF, μg./25 ♀ | GR, percent | LB, percent | SMC, percent |
|---|---|---|---|---|
| 2 | 8 | >0.1 | >0.05 | 0.01 |
| 3 | 8 | >0.1 | >0.05 | >0.1 |
| 4 | 5 | 0.05 | 0.03 | 0.005 |
| 5 | 5 | 0.08 | 0.01 | 0.01 |
| 6 | 30 | 0.08 | 0.05 | 0.05 |
| 7 | 30 | >0.1 | 0.05 | 0.05 |
| 8 | 30 | 0.1 | 0.05 | 0.08 |
| 9 | 5 | 0.08 | 0.03 | 0.05 |
| 10 | 5 | 0.1 | 0.008 | 0.03 |
| 11 | 30 | 0.1 | 0.01 | >0.1 |
| 13 | 30 | >0.1 | 0.03 | 0.1 |
| 17 | 30 | >0.1 | 0.008 | >0.1 |
| 19 | 30 | >0.1 | >0.05 | >0.1 |
| 20 | 30 | >0.1 | 0.05 | >0.1 |
| 23 | 50 | >0.1 | >0.05 | >0.1 |
| 24 | 30 | >0.1 | 0.03 | >0.1 |
| 25 | 50 | >0.1 | 0.01 | >0.1 |
| 26 | 80 | >0.1 | 0.05 | >0.1 |
| 27 | 50 | >0.1 | >0.05 | >0.1 |
| 29 | 10 | >0.1 | 0.05 | >0.1 |
| 30 | 30 | >0.1 | >0.05 | >0.1 |
| 31 | 10 | >0.1 | 0.05 | >0.1 |
| 32 | 5 | >0.1 | 0.05 | >0.1 |
| 33 | 10 | >0.1 | >0.05 | >0.1 |
| 36 | 20 | >0.1 | | >0.1 |
| 37 | 3 | >0.1 | 0.005 | >0.1 |
| 38 | 3 | >0.1 | 0.003 | >0.1 |
| 39 | 8 | >0.1 | 0.05 | 0.05 |
| 40 | 8 | >0.1 | 0.03 | >0.1 |
| 41 | 8 | >0.1 | 0.05 | 0.08 |
| 42 | 50 | >0.1 | 0.05 | 0.05 |
| 46 | 8 | >0.1 | 0.05 | 0.03 |
| 47 | 8 | 0.1 | 0.005 | 0.05 |
| 48 | 80 | >0.1 | >0.05 | >0.1 |
| 49 | 5 | >0.1 | 0.008 | 0.1 |
| 50 | 8 | 0.1 | 0.05 | 0.1 |
| 51 | 50 | >0.1 | >0.05 | >0.1 |
| 52 | 10 | >0.1 | 0.05 | 0.1 |
| 53 | 100 | >0.1 | >0.05 | >0.1 |
| 54 | 2.5 | 0.01 | 0.005 | 0.01 |
| 55 | 0.8 | 0.005 | 0.001 | 0.01 |
| 56 | 1.5 | 0.01 | 0.001 | 0.03 |
| 59 | 10 | >0.1 | | >0.1 |
| 60 | 30 | >0.1 | | >0.1 |
| 61 | 30 | >0.1 | | >0.1 |
| 62 | 30 | >0.1 | | >0.1 |
| 63 | 30 | >0.1 | | >0.5 |
| 64 | 4 | 0.05 | | 0.08 |
| 65 | 8 | 0.05 | | 0.01 |
| 66 | 8 | >0.1 | 0.03 | 0.1 |
| 67 | 15 | >0.1 | 0.03 | >0.1 |
| 68 | 40 | >0.1 | >0.05 | >0.1 |
| 69 | 50 | >0.1 | 0.05 | >0.1 |

TABLE—Continued

| Compound Number | HF, μg./25 ♀ | GR, percent | LB, percent | SMC, percent |
|---|---|---|---|---|
| 70 | 30 | >0.1 | 0.05 | >0.1 |
| 71 | 7 | >0.1 | 0.03 | 0.05 |
| 78 | 8 | >0.1 | 0.03 | 0.05 |
| 84 | 5 | >0.1 | 0.005 | >0.1 |
| 85 | 8 | >0.1 | 0.01 | 0.05 |
| 89 | 7 | >0.1 | 0.05 | >0.1 |
| 94 | 8 | >0.1 | 0.05 | >0.1 |
| 101 | 2.5 | 0.05 | 0.005 | 0.01 |
| 104 | 6 | 0.03 | 0.008 | 0.05 |
| 105 | 7 | 0.03 | 0.01 | 0.005 |
| 106 | 7 | 0.03 | 0.01 | 0.008 |
| 107 | 3 | 0.03 | 0.005 | 0.003 |
| 108 | 7 | 0.03 | 0.01 | 0.005 |
| 109 | 3 | 0.03 | 0.008 | 0.1 |
| 110 | 6 | 0.03 | 0.01 | >0.1 |
| 111 | 7 | 0.1 | 0.03 | 0.03 |
| 112 | 7 | >0.1 | >0.05 | 0.1 |
| 118 | 4 | 0.1 | 0.005 | 0.008 |
| 121 | 8 | 0.1 | 0.01 | 0.03 |
| 122 | 5 | 0.1 | 0.01 | 0.1 |
| 124 | 5 | 0.05 | 0.005 | 0.01 |
| 126 | 5 | 0.1 | 0.008 | >0.1 |
| 130 | 5 | 0.03 | >0.003 | 0.01 |
| 133 | 5 | >0.1 | 0.05 | >0.1 |
| 137 | 6 | >0.1 | 0.005 | 0.03 |
| 138 | 5 | 0.1 | 0.03 | 0.01 |
| 142 | 6 | 0.03 | 0.003 | 0.05 |
| 143 | 4 | 0.03 | 0.01 | 0.03 |
| 149 | 5 | 0.03 | 0.03 | 0.03 |
| 152 | 4 | 0.08 | 0.008 | 0.05 |
| 155 | 4 | >0.1 | 0.03 | 0.1 |
| 157 | 3 | 0.05 | 0.008 | 0.01 |
| 165 | 6 | 0.03 | 0.01 | 0.001 |
| 171 | 3 | 0.03 | 0.005 | 0.03 |
| 172 | 3 | 0.01 | 0.005 | 0.005 |
| 185 | 8 | >0.1 | 0.01 | >0.1 |
| 186 | 9 | >0.1 | 0.03 | >0.1 |
| 187 | 5 | >0.1 | 0.01 | >0.1 |
| 191 | 4 | >0.1 | 0.005 | 0.05 |
| 192 | 2 | 0.03 | 0.003 | 0.03 |
| 195 | 7 | >0.1 | >0.05 | >0.1 |
| 200 | 8 | 0.1 | 0.03 | 0.05 |

In testing against milkweed bug representative LD-50 results obtained were for compound numbers 47, 55 and 56–0.01%; for compound numbers 49, 67 and 143–0.03%; compound number 64–0.05%; compound number 68–0.08% and compound number 54–0.008%.

Compound number 55 is extremely useful in the control of European corn borer (*Pyrausta nubilalis* (Hubner)).

The same test procedure as mentioned above for salt marsh caterpillar was used for cotton bollworm (*Heliothis zea* (Boddie)), except that leaves of Romaine lettuce were utilized as the host plant rather than bitter dock. The following compounds were found to be active against cotton bollworm: the LD-50 values obtained were (5), (54) and (143) 0.005%; (10) 0.01%; (13) 0.03%; (137) 0.001%; (55), (138), (141), and (142) 0.003%; and (56) 0.008%.

The compounds were also found to be active against two-spotted mite (*Tetranychus urticae* (Koch)). Lima bean plants (Phaseolus sp.) were utilized as the host plant and infested with 50 to 75 mites of various ages. Twenty-four hours after infestation, they were sprayed to the point of run off with aqueous suspension of the toxicant. Test concentrations range from 0.05% to that at which 50% mortality was obtained. The following compounds exhibited LD-50 values of 0.005% (9) and (56); 0.001% (55) and 0.008% (46).

The compounds were also found to be active against black bean aphid (*Aphis fabae* (Scop.)). The same test procedure as given for the two-spotted mite above was used for black bean aphid except that nasturtium (Tropaeolum sp.) plants approximately 2 to 3 inches tall were used as the host plant. The following compounds exhibited LD-50 values of 0.005% (40); 0.005% (55); 0.003% (37); 0.003% (38); 0.003% (65); 0.008% (56); and 0.008% (64).

Animal systemic evaluation tests

Candidate test compounds, usually formulated in Tween-20®(polyoxyethylene (20) Sorbitan monolaurate), are administered orally by stomach tube at an initial dosage of 400 mg./kg. to fasted male Swiss albino mice. Two hours after treatment, the mice are killed by cervical dislocation and both thighs are dissected from each test animal and placed in labeled glass vials. Each vial is inoculated with 10 newly hatched black blow fly larvae (*Phormia regina* (Meigen)) and stored in an incubator at 80° F. and 40–50% relative humidity. Tissues from mice that die during the two hour holding period after administration of the compounds are processed in the same manner. After the larvae had fed on the tissues for 48 hours, the vials are examined and the percentage of larvae mortality in each is noted. If 80% or more of the larvae are killed at the initial dosage, successively lower dosages are then tested until the lowest dosage that killed at least 80% of the larvae is determined.

In this animal systemic insecticide evaluation test, compounds are tested further on guinea pigs, using the oral route of administration. The compounds are formulated as solutions or suspensions in Tween 20® and administered at an initial dosage of 100 mg./kg. Twenty-four hours prior to treatment, the guinea pigs are wounded and the wounds infested with larvae of the black blow fly (*Phormia regina* (Meigen)). At four and twenty-four hours after treatment, stable flies (*Stomoxys calcitrans* (L.)) are fed on the guinea pigs. Engorged flies are held for 24 hours to see if they are killed by the blood they ingest. At 24 hours after treatment, the wounds are examined to see if the fly larvae are killed by the insecticide. If the larvae are alive, they are removed from the wounds. If any of the arthropods are killed at the initial dosage, the candidate insecticides are administered at lower dosages until there was no significant insecticidal activity. The following table gives the results of the mouse assay and guinea pig assay tests described above.

TABLE V.—ANIMAL SYSTEMIC INSECTICIDE ACTIVITY, LOWEST DOSAGE

| Compound Number | Mouse assay | | Guinea pig assay | | |
|---|---|---|---|---|---|
| | Lethal to mice (mg./kg.) | 80%+ active (mg./kg.) | Lethal to g. pig (mg./kg.) | Blow fly larvae (mg./kg.) | 90%+ Activity against stable flies (4 hrs.) |
| 1 | >400 | 400 | >100 | | 100 |
| 2 | 400 | 200 | 100 | 100 | 50 |
| 3 | >400 | 100 | 100 | 50 | 25 |
| 4 | 200 | 100 | >100 | 25 | 12 |
| 10 | 200 | 50 | >100 | 50 | |
| 17 | >400 | 50 | >100 | | 100 |
| 32 | >400 | 50 | 100 | 25 | 25 |
| 33 | 400 | 100 | 100 | 50 | 100 |
| 36 | >400 | 50 | 100 | 100 | 50 |
| 19 | >400 | 200 | 100 | 100 | 50 |
| 39 | 100 | 50 | >100 | 100 | |
| 46 | 200 | 25 | 100 | 100 | 100 |
| 48 | >400 | 200 | >100 | 100 | |
| 51 | >400 | 200 | 100 | 100 | |
| 60 | >400 | 200 | >100 | 100 | 100 |
| 61 | >400 | 200 | >100 | 100 | |
| 65 | 100 | 50 | 100 | 50 | 50 |
| 66 | 200 | 50 | 50 | 25 | 25 |
| 67 | 200 | 100 | 50 | 50 | 25 |
| 84 | 200 | 100 | 200 | 100 | 50 |
| 86 | 400 | 200 | >100 | 100 | 100 |
| 87 | 400 | 50 | 50 | 50 | 25 |
| 94 | 200 | 100 | 100 | 100 | 50 |
| 133 | >100 | 200 | | | |
| 134 | >400 | 25 | | | |
| 135 | >400 | 50 | | | |
| 136 | >400 | 100 | | | |
| 137 | 100 | 50 | | | |
| 138 | >100 | 25 | | | |
| 139 | >400 | 100 | | | |
| 141 | 50 | | | | |
| 144 | >400 | 100 | | | |
| 145 | >400 | 100 | | | |
| 146 | >400 | 100 | | | |
| 148 | >400 | 100 | | | |
| 149 | <50 | 25 | | | |
| 150 | >400 | 200 | | | |
| 151 | 100 | 50 | | | |
| 152 | 200 | 200 | | | |

The test results indicate that these compounds are biologically active and are useful as animal systemic insecticides. The compounds can be used as effective parasiticides by applying them in a variety of ways and at various concentrations, depending upon the nature and habitat of the parasite to be controlled.

The candidate compounds were employed in an in vitro tick assay. In this test unfed lone star tick nymphs (*Amblyomma americanum* (L.)) were confined for 24 hours in cotton cloth that had been treated in acetone solutions of the test compounds. The percentage of nymphal mortality was then observed. If 80% or more of the nymphs were killed at the initial screening level of 1.0% for a given compound, the compound was tested further at lower levels. The compounds 5, 11, 17, 20, 23, 26, 31, 33, 36, 38, 61, 64 and 65 exhibited 80% or better control of the tick nymphs at 0.5%. Compound number 29 exhibited 80% or better control of the tick nymphs at 0.1% and compound number 32 exhibited 80% or better control at 1.0% concentrations. Compound number 28 at a concentration of 0.05% was better than 80% lethal to tick nymphs.

Internal animal parasite systemic tests

The following procedures describe the chemoprophylactic and chemotherapeutic efficacy tests utilized to demonstrate the animal parasitology activity of the phosphorus-containing oxime carbamate compositions of the present invention.

*Test 1.*—Unparasitized weanling mice were offered medicated food for 1–2 days prior to inducing infections, and for a total of 21 days infections were administered per os using 100–300 embryonated ova/mouse of *Syphacia obvelata* (So) and 100–300 embryonated ova/mouse of *Aspiculuris tetraptera* (At).

A suitable number of unmedicated littermate mice also received the above infection and served as control to determine the comparative efficacy of the medications. All mice were sacrificed after 21 days (the medication period) and the residual parasites found in the intestine were identified and counted. These counts in the medicated groups were compared to the unmedicated (controls) and a percent efficacy was assigned, (M/IC×100)−100=percent efficacy.

*Test 2.*—Weanling mice were housed together with older pinworm (So) and (At) infected mice in a box with damp litter for 15 to 21 days to allow a heavy pin worm infection containing all stages of oxyurid (So and At) to naturally build up. At the end of this holding period, the post-weanling littermates were weighed individually and dosed with the subject compounds (suspended in Tween 20®) on a body weight basis. One to 3 days later, these mice were sacrificed and the residual worms identified, counted and compared to the unmedicated controls. Examples of efficacy observed for six compounds of the present invention are given in the following table.

TABLE VI.—INTERNAL ANIMAL SYSTEMIC ACTIVITY

| Compound number | Test procedure | Dosage: (1) p.p.m. or (2) mg./kg. | Percent efficacy | |
|---|---|---|---|---|
| | | | So | A |
| 2 | (1) | 500 | 100 | 100 |
| 2 | (1) | 2,000 | 80 | 100 |
| 2 | (2) | 50 | 85 | 85 |
| 2 | (2) | 100 | 65 | 85 |
| 9 | (1) | 500 | 100 | 100 |
| 9 | (1) | 1,000 | 100 | 100 |
| 17 | (1) | 1,000 | 98 | 97 |
| 17 | (1) | 2,000 | 90 | 55 |
| 17 | (2) | 50 | 30 | 0 |
| 17 | (2) | 100 | 45 | 30 |
| 17 | (2) | 200 | 55 | 100 |
| 46 | (1) | 250 | 100 | 100 |
| 46 | (2) | 50 | 85 | 75 |
| 46 | (2) | 100 | 100 | 100 |
| 66 | (1) | 1,000 | 100 | 100 |
| 66 | (2) | 50 | 65 | 100 |
| 66 | (2) | 100 | 80 | 100 |
| 76 | (2) | 50 | 92 | 97 |
| 76 | (2) | 100 | 100 | 98 |
| 7 | (1) | 500 | 100 | 100 |
| 7 | (2) | 50 | 95 | 95 |
| 19 | (1) | 2,000 | 100 | 100 |

TABLE—Continued

| Compound number | Test procedure | Dosage: (1) p.p.m. or (2) mg./kg. | Percent efficacy So | At |
|---|---|---|---|---|
| 19 | (2) | 50 | 70 | 85 |
| 29 | (1) | 1,000 | 98 | 100 |
| 29 | (2) | 50 | 98 | 65 |
| 48 | (1) | 250 | 100 | 100 |
| 48 | (2) | 50 | 95 | 85 |
| 51 | (1) | 250 | 90 | 65 |
| 51 | (2) | 50 | 95 | 15 |
| 79 | (1) | 500 | 100 | 100 |
| 79 | (2) | 50 | 55 | 92 |
| 86 | (2) | 50 | 90 | 95 |
| 87 | (2) | 50 | 100 | 100 |
| 88 | (2) | 50 | 98 | 80 |
| 101 | (2) | 50 | 100 | 100 |
| 102 | (2) | 50 | 100 | 85 |
| 4 | (1) | 250 | 100 | 100 |
| 10 | (1) | 500 | 100 | 100 |
| 28 | (1) | 500 | 100 | 100 |
| 70 | (1) | 250 | 95 | 87 |
| 134 | (1) | 500 | 100 | 100 |
| 135 | (1) | 500 | 100 | 75 |
| 136 | (1) | 500 | 100 | |
| 138 | (1) | 250 | 100 | 100 |
| 139 | (2) | 100 | 100 | 100 |
| 140 | (1) | 500 | 100 | |
| 141 | (1) | 500 | 100 | |
| 144 | (1) | 500 | 100 | 100 |
| 145 | (1) | 500 | 100 | |
| 147 | (1) | 500 | 95 | 100 |
| 149 | (1) | 15 | 100 | |
| 150 | (2) | 25 | 100 | 0 |
| 151 | (2) | 12.5 | 100 | 100 |
| 152 | (2) | 12.5 | 100 | 100 |

The compounds of the present invention are useful as effective insecticides, herbicides, and external and internal animal parasiticides and are applicable in a variety of ways at various concentrations. In practice, the compounds are formulated with an inert adjuvant utilizing methods well known to those skilled in the art, thereby making them suitable for application and administration as dusts, sprays, drenches and the like in the form and manner required. The mixtures can be dispersed in water with the aid of a wetting agent or they can be employed in organic liquid compositions, oil-in-water, water-in-oil emulsions, with or without the addition of wetting, dispersing or emulsifying agents. Administration of said parasiticidal compositions to animal for systemic control of parasites can be in animal feedstuffs which contain feed components of such as grain, grasses and the like, and certain beneficial additives such as vitamins, proteins, fats, minerals and carbohydrates. They can be given also in drinking water or skimmed milk, or in the form of tablets or capsules. Further methods of application include sprays, dyes, dips, dermal "pour-on," subcutaneous administration, intramuscular injection and the like. The exact dose to be administered to the animal is dependent upon the parasite to be controlled by the particular compound employed, as described herein, as well as upon whether the administration is to be a single dose or a multiple dose over a period of days. In general, it has been found that the systemic parasiticides of this invention can be administered orally or parenterally to warm blooded animals in amounts ranging from about 0.01 to about 600 milligrams per kilogram of body weight.

What is claimed is:
1. A compound having the formula

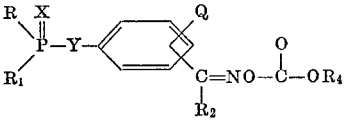

in which
X and Y are independently selected from the group consisting of oxygen and sulfur;
R is selected from the group lower alkyl or lower alkoxy, having from 1 to 6 carbon atoms, inclusive;
$R_1$ is selected from the group consisting of lower alkyl, lower alkoxy having from 1 to 6 carbon atoms, inclusive, amino, lower alkyl-substituted amino and phenyl;
Q is selected from the group consisting of hydrogen, divalent tetramethylenediene-1,3, lower alkoxy or lower alkyl having from 1 to 4 carbon atoms, inclusive, nitro and halogen; and lower dialkyl substituted thionophosphoryloxy;
$R_2$ is selected from the group consisting of hydrogen, lower alkyl having from 1 to 4 carbon atoms and phenyl; and
$R_4$ is selected from the group consisting of lower alkyl having from 1 to 4 carbon atoms, inclusive, and β-chloro-loweralkyl having from 2 to 4 carbon atoms, inclusive.
2. A compound according to claim 1 in which R is $C_2H_5O$, $R_1$ is $C_2H_5O$, X is S, Y is O and Q is H, and the $C(R_2)=NOR_3$ group is in the nuclear 4-position in which $R_2$ is $CH_3$ and $R_3$ is $C(O)OC_2H_5$.
3. A compound according to claim 1 in which R is $C_2H_5O$, $R_1$ is $C_2H_5O$, X is S, Y is O and Q is H, and the $C(R_2)=NOR_3$ group is in the nuclear 3-position in which $R_2$ is $CH_3$ and $R_3$ is $C(O)OC_2H_5$.

References Cited
UNITED STATES PATENTS 2,995,568 8/1961 Malz et al. _____ 260—944 X
3,293,328 12/1966 Berkelhammer et al. \_\_ 260—944
3,527,848 9/1970 Brown _____ 260—944

JOSEPH REBOLD, Primary Examiner
R. L. RAYMOND, Assistant Examiner

U.S. Cl. X.R.

71—86, 87; 260—239 BC, 247.1, 247.5 R, 247.7 A, 268 C, 293 R, 293.4 B, 294.7 A, 306.7, 307 F, 309.2, 309.6, 310 R, 326.11, 326.8, 326.82, 455 P, 930, 940, 949; 424—200, 211

PO-1050
(5/69)

UNITED STATES PATENT OFFICE
CERTIFICATE OF CORRECTION

Patent No. 3,652,737  Dated March 28, 1972

Inventor(s) Arnold D. Gutman

It is certified that error appears in the above-identified patent and that said Letters Patent are hereby corrected as shown below:

Column 2, line 58, between the words "inclusive;" and "lower", the following phrase should be inserted, ---lower alkyl sulfonato having from 1 to 6 carbon atoms, inclusive;---.

Column 3, line 43, the word "folar" should read ---foliar---.

Column 4, line 65, the word "dieethylphosphorothioyl" should read ---diethylphosphorothioyl---.

Under Columns 5 and 6, immediately above the formula, insert ---TABLE I---.

Column 8, in TABLE I, for Compound No. 82, under the heading M.P. (°C.) $n_D^{30}$, the numerals "1.5086" should read --- 1.5806 ---.

Column 10, in TABLE I, for Compound No. 193, under the heading M.P. (°C.) $n_D^{30}$, the numerals "1.358" should read --- 1.5358 ---.

Column 12, line 53, the word "nad" should read ---and---.

Column 13, in TABLE IV, under the heading SMC %, for Compounds No. 63, 64 and 65, the numerals reading ">0.5", "0.08" and "0.01", respectively, should read --- >0.1 ---, --- 0.05 ---, and --- 0.08 ---, respectively.

Signed and sealed this 19th day of September 1972.

(SEAL)
Attest:

EDWARD M. FLETCHER, JR.
Attesting Officer

ROBERT GOTTSCHALK
Commissioner of Patents